US010119560B2

(12) United States Patent
Valente et al.

(10) Patent No.: US 10,119,560 B2
(45) Date of Patent: Nov. 6, 2018

(54) AXLE ASSEMBLY WITH HYDRAULICALLY-OPERATED DISCONNECT MECHANISM AND SPIN-ON HYDRAULIC FILTER

(71) Applicant: American Axle & Manufacturing, Inc., Detroit, MI (US)

(72) Inventors: Paul J. Valente, Berkley, MI (US); James P. Downs, South Lyon, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 284 days.

(21) Appl. No.: 15/290,036

(22) Filed: Oct. 11, 2016

(65) Prior Publication Data

US 2018/0100524 A1  Apr. 12, 2018

(51) Int. Cl.
| | |
|---|---|
| *F15B 21/04* | (2006.01) |
| *B60K 17/02* | (2006.01) |
| *B60K 23/04* | (2006.01) |
| *F15B 11/10* | (2006.01) |
| *B60K 17/08* | (2006.01) |
| *B60K 17/16* | (2006.01) |
| *F16H 48/30* | (2012.01) |
| *B60K 17/344* | (2006.01) |

(52) U.S. Cl.
CPC ............ *F15B 21/041* (2013.01); *B60K 17/02* (2013.01); *B60K 17/08* (2013.01); *B60K 17/165* (2013.01); *B60K 17/352* (2013.01); *B60K 23/04* (2013.01); *F15B 11/10* (2013.01); *B60K 17/344* (2013.01); *B60Y 2400/406* (2013.01); *F15B 2211/615* (2013.01)

(58) Field of Classification Search
CPC .. F15B 21/041; F15B 2211/615; F15B 11/10; F16D 25/0638; F16D 25/063; F16D 25/06; F16D 25/12; B60Y 2400/406; B60K 2023/0858; B60K 2023/0866
See application file for complete search history.

(56) References Cited

U.S. PATENT DOCUMENTS

| | | | |
|---|---|---|---|
| 2,629,543 A | 2/1953 | Reynolds | |
| 4,009,572 A * | 3/1977 | Cooper | B01D 35/02 60/454 |
| 4,061,572 A | 12/1977 | Cohen et al. | |

(Continued)

*Primary Examiner* — Sherry L Estremsky
(74) *Attorney, Agent, or Firm* — Harness, Dickey & Pierce, P.L.C.

(57) ABSTRACT

An axle assembly can include a housing defining a reservoir and cylindrical bore open thereto. A clutch can selectively transmit torque between input and output members. A first inlet/outlet of a pump can be in fluid communication with the reservoir and define first threads coaxial with the cylindrical bore. The pump can be configured to pump fluid from the first inlet/outlet to an actuator of the clutch via a second inlet/outlet. The filter can include a base, port, and filter element. The port can define second threads that threadably engage the first threads. The base can be fixedly coupled to the port and include a cylindrical wall coaxial with the second threads. A seal member can form a seal between the cylindrical wall and the cylindrical bore when the first and second threads are engaged. The filter element can be disposed between the reservoir and the first inlet/outlet.

20 Claims, 7 Drawing Sheets

(56) References Cited

U.S. PATENT DOCUMENTS

| | | | |
|---|---|---|---|
| 5,535,588 A * | 7/1996 | Peterson | B01D 35/147 60/454 |
| 6,679,990 B2 * | 1/2004 | Reinhart | B01D 29/21 210/232 |
| 6,849,179 B1 | 2/2005 | Taylor et al. | |
| 8,961,353 B2 | 2/2015 | Valente et al. | |
| 9,089,248 B2 | 7/2015 | Yoo | |

* cited by examiner

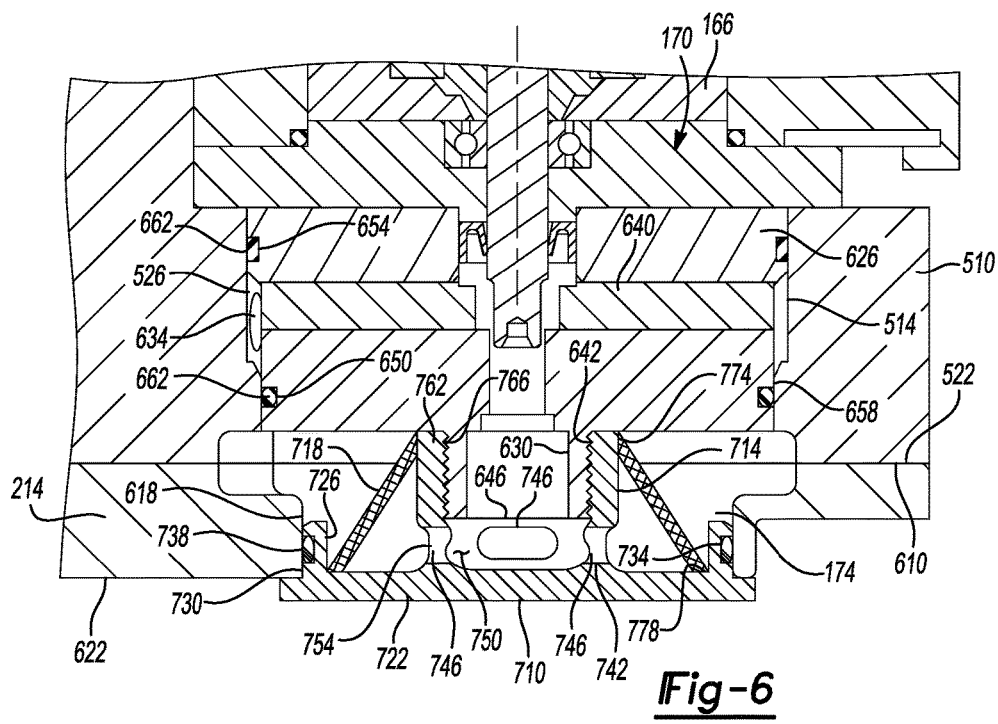
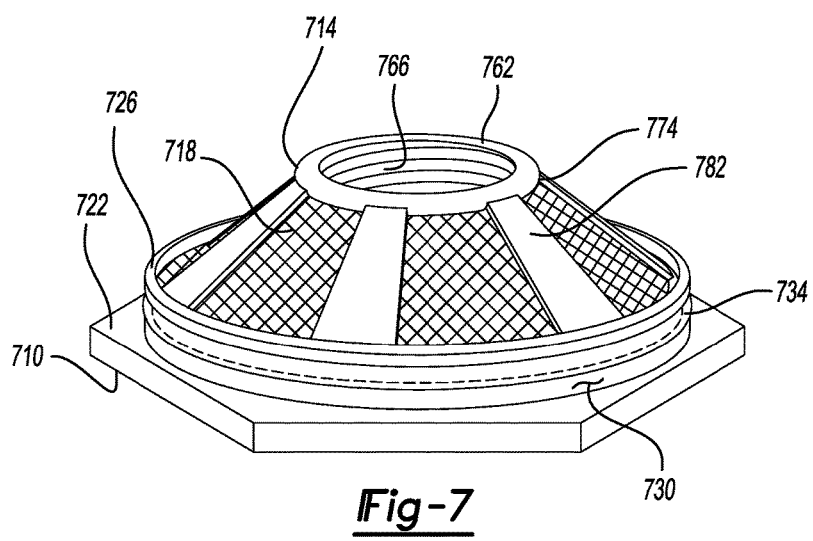

US 10,119,560 B2

AXLE ASSEMBLY WITH HYDRAULICALLY-OPERATED DISCONNECT MECHANISM AND SPIN-ON HYDRAULIC FILTER

FIELD

The present disclosure relates to an axle assembly with a hydraulically-operated disconnect mechanism and a spin-on hydraulic filter.

BACKGROUND

This section provides background information related to the present disclosure which is not necessarily prior art.

Disconnect mechanisms for axle assemblies can typically include a clutch configured to selectively interrupt rotary power transmission between an input member and one or more output members. The clutch can be selectively actuated by a hydraulically powered actuator, such as a piston-cylinder device. Typically, a pump provides hydraulic fluid from a reservoir to the actuator to selectively operate the actuator. In some applications, particulates can accumulate in the fluid within the reservoir. In such applications it can be advantageous to prevent the particulates from entering the pump.

SUMMARY

This section provides a general summary of the disclosure, and is not a comprehensive disclosure of its full scope or all of its features.

In one form, the present disclosure provides for an axle assembly including a housing, an input member, an output member, a clutch, a pump, and a filter. The housing can define a reservoir and a cylindrical bore open to the reservoir. The clutch can include a hydraulic actuator operable to selectively activate the clutch to selectively transmit rotary power between the input member and the output member. The pump can be mounted to the housing. The pump can include a first inlet/outlet and a second inlet/outlet. The first inlet/outlet can be in fluid communication with the reservoir and can define a first set of threads coaxial with the cylindrical bore. The second inlet/outlet can be in fluid communication with the actuator. The pump can be configured to pump a fluid between the first inlet/outlet and the second inlet/outlet. The filter can include a filter base, a filter port, a filter element, and a seal member. The filter port can define a second set of threads configured to threadably engage the first set of threads. The filter base can be fixedly coupled to the filter port and can include a cylindrical wall coaxial with the second set of threads. The seal member can form a seal between the cylindrical wall and the cylindrical bore when the first and second sets of threads are threadably engaged. The filter element can be disposed between the reservoir and the first inlet/outlet.

In another form, the present disclosure provides for an axle assembly including a housing, an input member, an output member, a clutch, a pump, and a filter. The housing can define a reservoir and a bore that extends through a first side of the housing and a second side of the housing and is open to the reservoir between the first and second sides. The clutch can include a hydraulic actuator operable to selectively activate the clutch to selectively transmit rotary power between the input member and the output member. The pump can include a pump body. The pump body can be mounted to the housing. The pump body can include a first inlet/outlet and a second inlet/outlet. The first inlet/outlet can be in fluid communication with the reservoir and can define a first set of threads coaxial with the cylindrical bore. The second inlet/outlet can be in fluid communication with the actuator. The pump can be configured to pump a fluid between the first inlet/outlet and the second inlet/outlet. The filter can include a filter base, a filter port, a filter element, and a seal member. The filter port can define a second set of threads configured to threadably engage the first set of threads. The filter port can be fixedly coupled to the filter base. At least one aperture can extend radially through an outer surface of the filter port and an inner surface of the filter port to permit fluid communication between the reservoir and the first inlet/outlet. The seal member can form a seal between the filter base and the housing when the first and second sets of threads are threadably engaged. The filter element can be disposed between the reservoir and the first inlet/outlet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a sectional view of a portion of the axle assembly of FIG. 2, taken along a rotational axis of a pump of the axle assembly, and illustrating a spin-on filter of a first configuration;

FIG. 7 is a perspective view of the spin-on filter of FIG. 6; and

Corresponding reference numerals indicate corresponding parts throughout the several views of the drawings.

DETAILED DESCRIPTION

Figure 1:
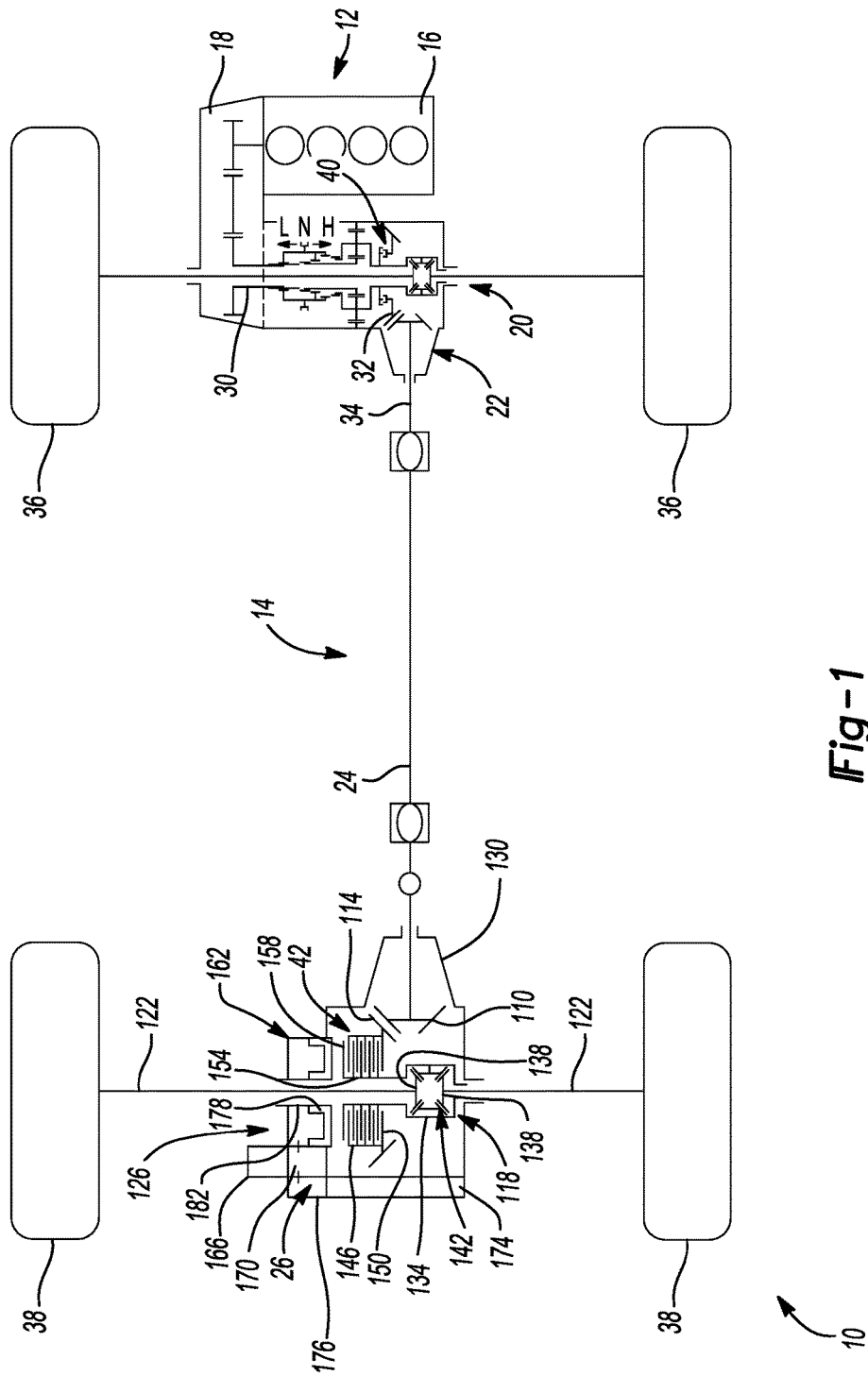
FIG. 1 is a schematic illustration of an exemplary vehicle having a vehicle driveline constructed in accordance with the teachings of the present disclosure.
Figure 2:
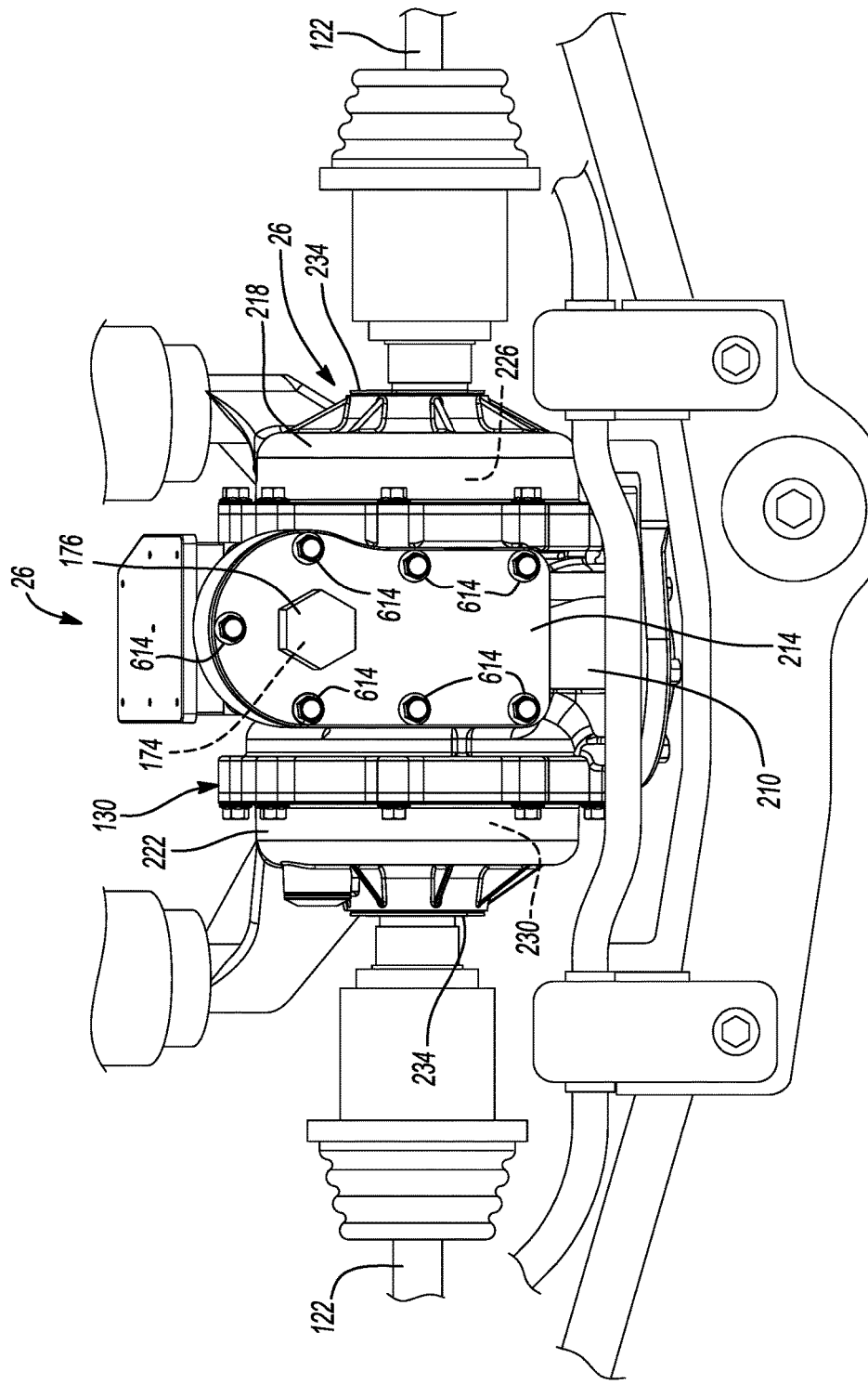
FIG. 2 is a bottom perspective view of an exemplary axle assembly of the vehicle driveline of FIG. 1.
Figure 3:
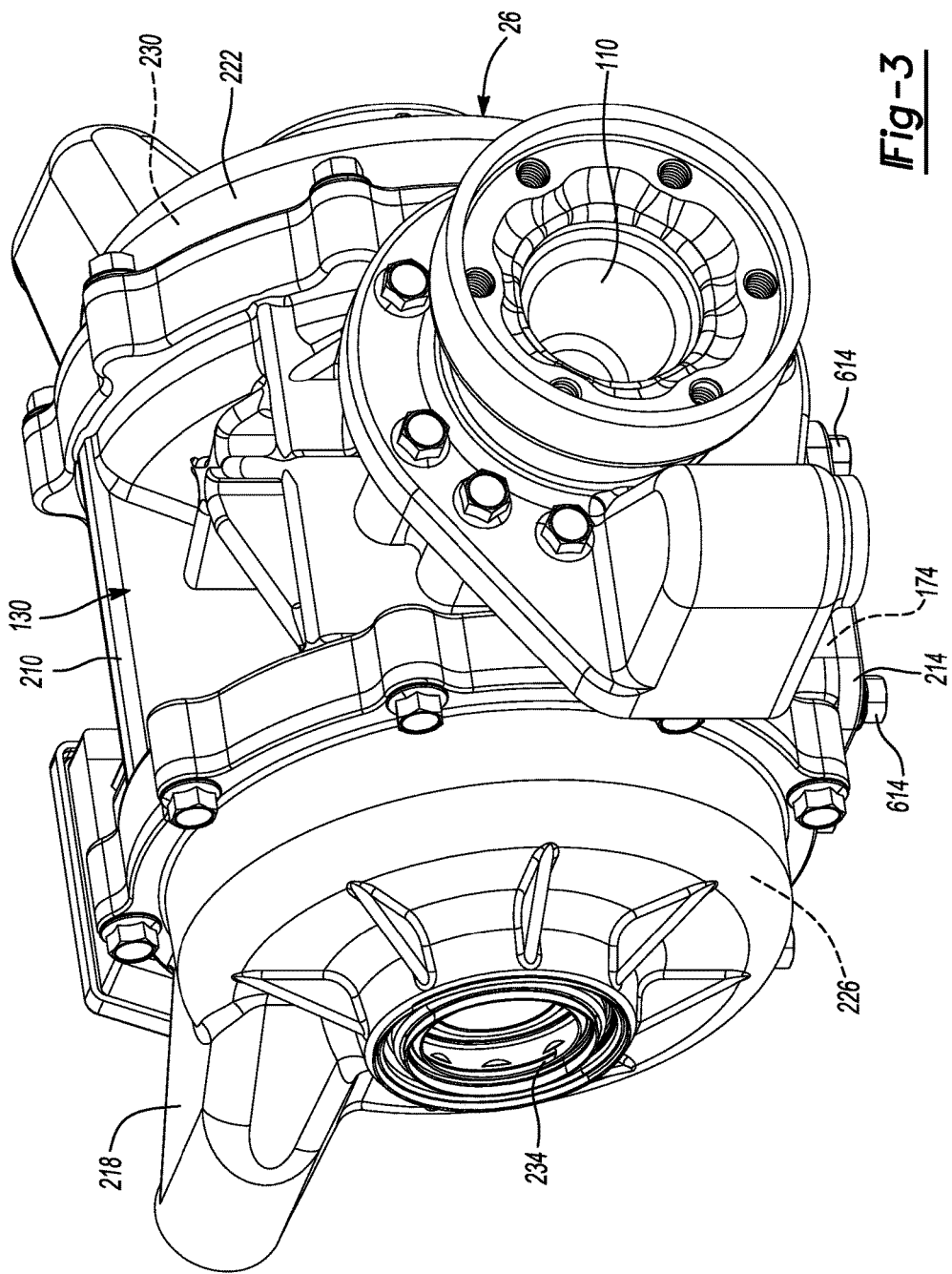
FIG. 3 is a front perspective view of the axle assembly of FIG. 2.
Figure 4:
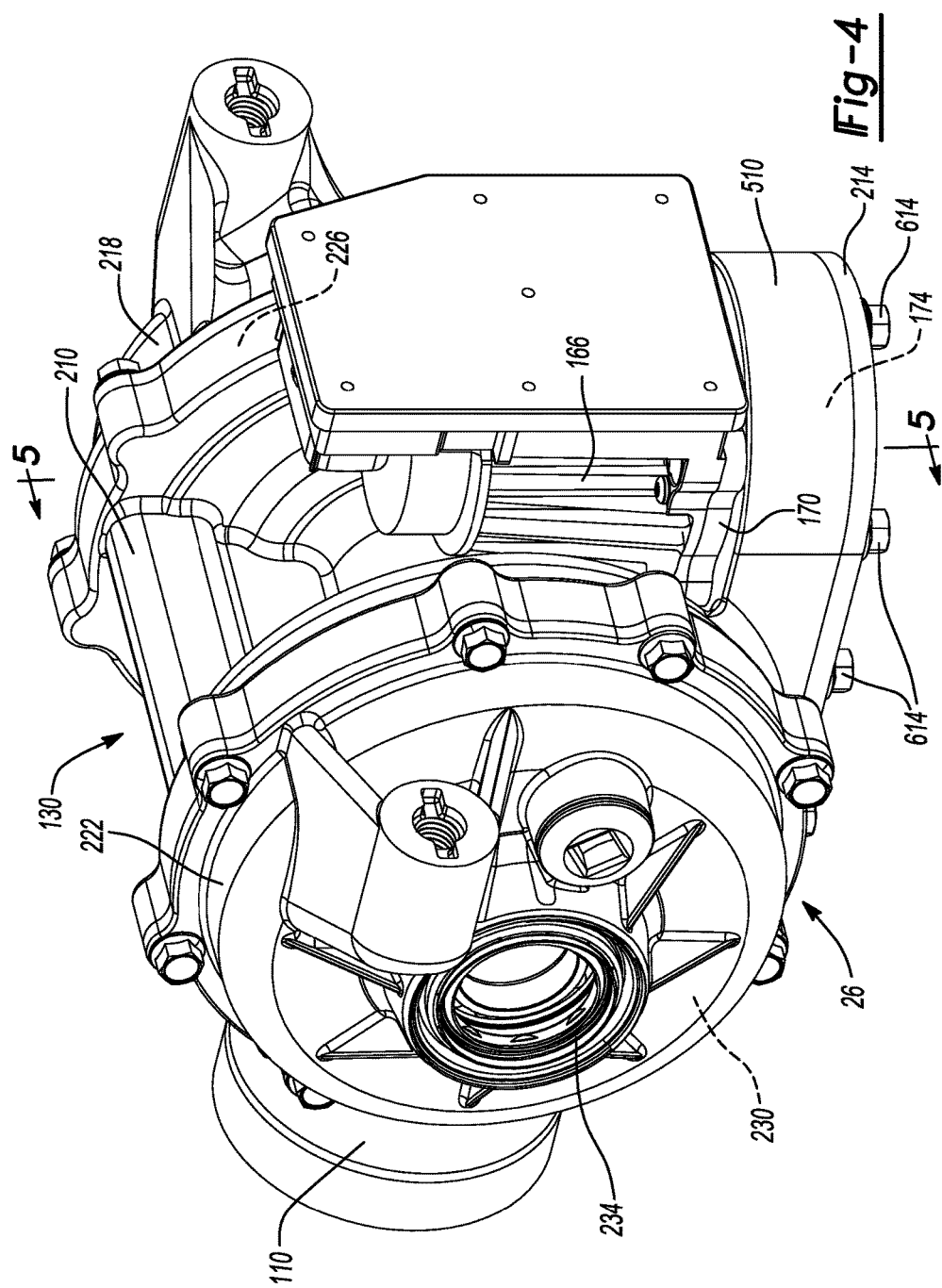
FIG. 4 is a rear perspective view of the axle assembly of FIG. 2.

With reference to FIG. 1 of the drawings, an exemplary vehicle having a driveline with a torque transfer device that includes a hydraulic filter constructed in accordance with the teachings of the present disclosure is generally indicated by reference numeral 10. The vehicle 10 can have a powertrain 12 and a driveline 14. The powertrain 12 can be conventionally constructed and can comprise a power source 16 and a transmission 18. The power source 16 can be configured to provide propulsive power and can comprise an internal combustion engine and/or an electric motor, for example.

The transmission 18 can receive propulsive power from the power source 16 and can output rotary power to the driveline 14. The transmission 18 can have a plurality of automatically or manually-selected gear ratios. The driveline 14 in the particular example provided is of an all-wheel drive configuration, but those of skill in the art will appreciate that the teachings of the present disclosure are applicable to other driveline configurations, including four-wheel drive configurations, rear-wheel drive configurations, and front-wheel drive configurations for example.

The driveline 14 can include a front axle assembly 20, a power take-off unit (PTU) 22, a prop shaft 24 and a rear axle assembly 26. An output of the transmission 18 can be coupled to an input of the front axle assembly 20 to drive an input member 30 of the front axle assembly 20. The PTU 22 can have a PTU input member 32, which can receive rotary power from the input member 30 of the front axle assembly 20, and a PTU output member 34 that can transmit rotary power to the prop shaft 24.

The prop shaft 24 can couple the PTU output member 34 to the rear axle assembly 26 such that rotary power output by the PTU 22 is received by the rear axle assembly 26. The front axle assembly 20 and the rear axle assembly 26 could be driven on a full-time basis to drive front and rear vehicle wheels 36 and 38, respectively. It will be appreciated, however, that the driveline 14 could include one or more clutches to interrupt the transmission of rotary power through a part of the driveline 14. In the particular example provided, the driveline 14 includes a first clutch 40, which can be configured to interrupt the transmission of rotary power into or through the PTU 22, and a second clutch 42, which can be configured to interrupt the transmission of rotary power into or through components within the rear axle assembly 26.

A detailed discussion of the front axle assembly 20, the PTU 22 and the first clutch 40 is not pertinent to the torque transfer device and hydraulic filter of the present disclosure and as such, need not be described in extensive detail herein as these components can be constructed as described in detail in U.S. Pat. No. 8,961,353, the disclosure of which is incorporated by reference as if fully set forth in detail herein.

The rear axle assembly 26 can include an input pinion 110, a ring gear 114, a second differential assembly 118, a pair of second shafts or output members 122, the second (axle disconnect) clutch 42 and a hydraulic circuit 126. The input pinion 110, ring gear 114, second differential assembly 118, and axle disconnect clutch 42 can be disposed within an axle housing assembly 130 of the rear axle assembly 26. The input pinion 110 can be coupled to an end of the prop shaft 24 for rotation therewith. The ring gear 114 can be meshed with the input pinion 110 and can be a bevel ring gear. The second differential assembly 118 can be configured to receive rotary power transmitted through the ring gear 114 and can have a differential case 134, a pair of second output members 138 and a means for permitting speed differentiation between the second output members 138.

In the example provided, the speed differentiation means comprises an open differential gearset 142 in which the second output members 138 are side gears. Each of the second shafts 122 can be coupled to a corresponding one of the second output members 138 for rotation therewith. In an alternative construction, not specifically shown, the speed differentiation means can be a planetary-type differential assembly having an internal gear, a planet carrier, a plurality of planet gear pairs and a sun gear configured to receive input torque and output differential torque to the second output members 138.

The axle disconnect clutch 42 is a torque transfer device that can selectively interrupt power transmission through the second differential assembly 118. The axle disconnect clutch 42 can be any type of clutch and can be mounted coaxially with the second differential assembly 118. In the particular example provided, the axle disconnect clutch 42 is a friction clutch that includes a clutch input member 146 that is coupled to the ring gear 114 for rotation therewith, a plurality of first friction plates 150 that are non-rotatably but axially slidably coupled to the clutch input member 146, a clutch output member 154, which is non-rotatably coupled to the differential case 134, a plurality of second friction plates 158, which are non-rotatably but axially slidably coupled to the clutch output member 154, and an actuator 162, which can be an element of the hydraulic circuit 126. The first and second friction plates 150 and 158 can be interleaved and the actuator 162 can be employed to compress the first and second friction plates 150 and 158 so that they frictionally engage one another so that rotary power can be transmitted from the ring gear 114 through the axle disconnect clutch 42 and to the differential case 134.

When the actuator 162 is disengaged the first and second friction plates 150 and 158 can be separated so that rotary power is not transmitted through the axle disconnect clutch 42. When the actuator 162 is disengaged, the rear wheels 38 can drive the second output members 138, but the axle disconnect clutch 42 can inhibit the transmission of rotary power into the ring gear 114 that would cause the ring gear 114 to correspondingly rotate. In this way, operation of the vehicle 10 in a front-wheel drive mode will not permit the rear wheels 38 to "back drive" the ring gear 114.

In FIG. 1, the hydraulic circuit 126 is schematically illustrated as including a motor 166, a pump 170, a hydraulic reservoir 174, the actuator 162, and a filter 176. The motor 166 can be any desired motor, such as a reversible DC servo electric motor that can be powered by the electrical system of the vehicle 10 for example. The pump 170 can be any type of fluid pump, such as a reversible gerotor pump for example. The hydraulic reservoir 174 can be configured to hold a quantity of suitable hydraulic fluid (i.e., hydraulic oil). In the example provided, the reservoir 174 is defined by a portion of the axle housing assembly 130 of the rear axle assembly 26.

The actuator 162 can be a single-acting hydraulic cylinder having a piston 178 that can be moved in a hollow cylinder 182 to cause engagement/disengagement of the first and second friction plates 150 and 158. The actuator 162 may optionally include a spring (not shown) that can bias the piston 178 in a predetermined direction, such as in a direction that corresponds to disengagement of the first and second friction plates 150 and 158. The cylinder 182 can be an annular cavity formed in the axle housing assembly 130. The piston can be an annular structure axially slidable within the cylinder 182.

The hydraulic reservoir 174 can be coupled to a first inlet/outlet 630 (FIG. 6) of the pump 170 for fluid communication, as described in greater detail below. The filter 176 can be disposed between the reservoir 174 and the first inlet/outlet 630 (FIG. 6) of the pump 170 to filter hydraulic oil as it passes between the pump 170 and the reservoir 174. The filter 176 is described in greater detail below. A second inlet/outlet 634 (FIG. 6) of the pump 170 can be coupled to an inlet/outlet 534 (FIG. 5) of the cylinder 182 of the actuator 162 for fluid communication. While not specifically shown in FIG. 1, the hydraulic circuit 126 may optionally include a bleed conduit that can couple the cylinder 182 of the actuator 162 to the reservoir 174 and can have a predetermined diameter configured to meter a flowrate of hydraulic fluid from the cylinder 182 to the reservoir 174 at a rate that can be less than a flowrate of the pump 170.

With reference to FIGS. 2-5 of the drawings, the axle housing assembly 130 can include a carrier or main housing 210, an oil pan 214, a first end cap 218, and a second end cap 222. The carrier housing 210 and the oil pan 214 can cooperate to define the reservoir 174. The first and second end caps 218, 222 can be fixedly but removably coupled to opposite axial ends of the carrier housing 210.

The first end cap 218 can cooperate with a first axial end of the carrier housing 210 to define a clutch cavity 226 into which portions of the axle disconnect clutch 42 can be received, while the second end cap 222 can cooperate with a second, opposite axial end of the carrier housing 210 to define a differential cavity 230 into which the differential assembly 118 can be received. In the example provided, the carrier housing 210 can have a central wall 232 (FIG. 5) that can generally separate the clutch cavity 226 from the differential cavity 230 and can define the cylinder 182.

Shaft seals 234 can be mounted on the first and second end caps 218, 222 and can be configured to form seals between the axle housing assembly 130 and the first and second output members 122, respectively. The first and second end caps 218, 222 can be sealingly engaged to the carrier housing 210 in any manner that is desired.

Figure 5:
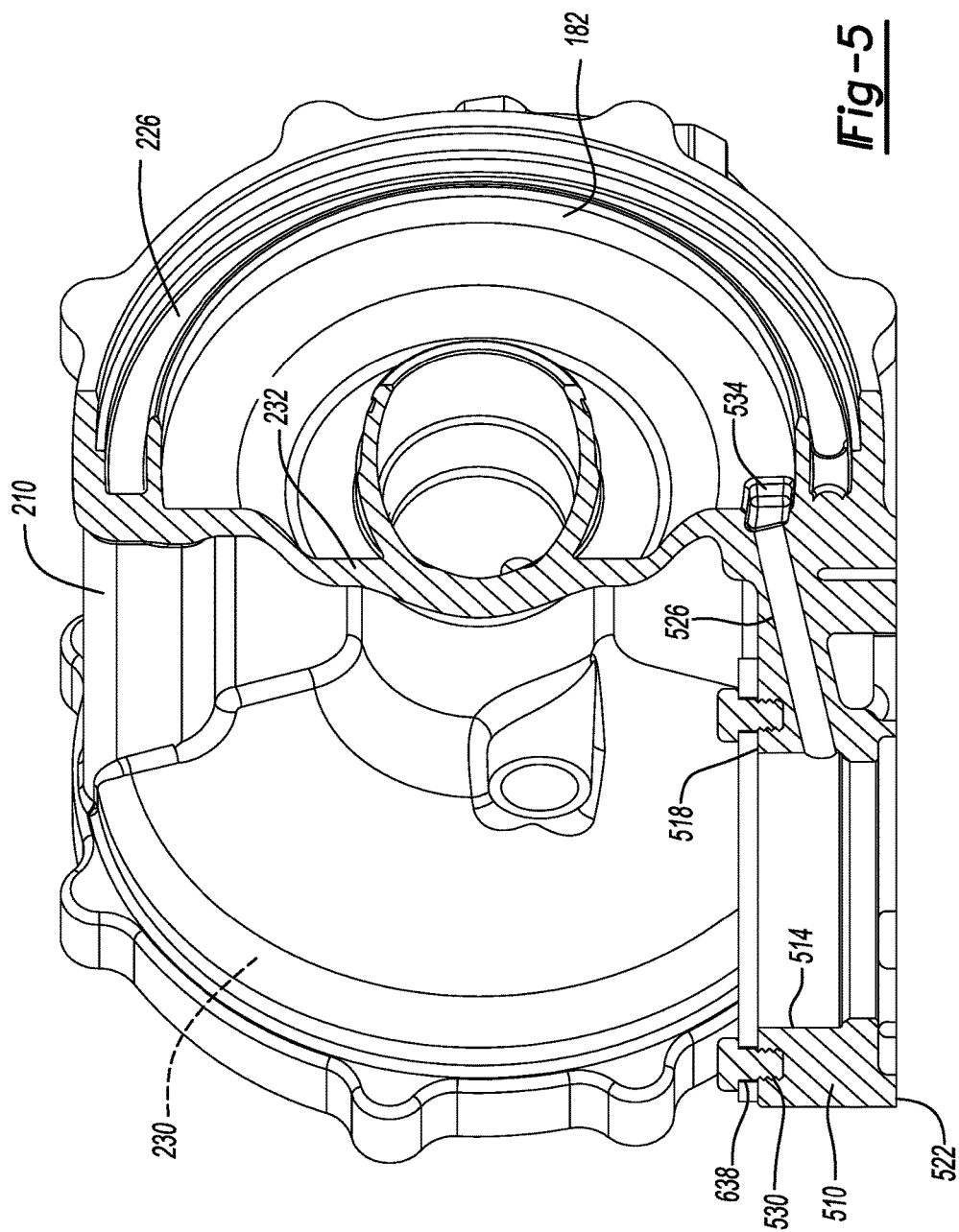
FIG. 5 is a partial sectional view of a carrier housing of the axle assembly of FIG. 2, taken along line 5-5 shown on FIG. 4.

With specific reference to FIGS. 5 and 6, the carrier housing 210 can define a pump mount 510 to which the pump 170 can be mounted. The pump mount 510 can define a pump bore 514 that can generally pass through the pump mount 510 to be open at an upper side 518 of the pump mount 510 and a bottom side 522 of the pump mount 510. In the example provided, the bottom side 522 of the pump mount 510 is also the bottom side of the carrier housing 210. The carrier housing 210 can also define an oil supply passage 526 that can have one end (i.e., inlet/outlet) open to the pump bore 514 and the other end (i.e., inlet/outlet) open to the cylinder 182 of the actuator 162. The oil supply passage 526 can be open to the pump bore 514 axially between the upper side 518 of the pump mount 510 and the bottom side 522. Thus, the oil supply passage 526 can be in fluid communication with the pump bore 514 and the cylinder 182 of the actuator 162. In the example provided, the pump 170 is mounted to the pump mount 510 by a plurality of mounting bolts 530.

With specific reference to FIG. 6, the oil pan 214 can be mounted to the carrier housing 210 such that an upper side 610 of the oil pan 214 can sealingly abut the bottom side 522 of the carrier housing 210 and pump mount 510. In the example provided the oil pan 214 includes a plurality of mounting holes and the carrier housing includes corresponding threaded bores such that the oil pan 214 can be coupled to the bottom side 522 with threaded fasteners (e.g., bolts 614 shown in FIG. 2). A gasket (not specifically shown) can be disposed between the oil pan 214 and the bottom side 522 to form a seal therebetween. The oil pan 214 can define a pan bore 618 that can extend through the oil pan 214 to be open at the upper side 610 of the oil pan 214 in order to be open to the reservoir 174 as well as the pump bore 514. The pan bore 618 can be open at a bottom side 622 of the oil pan 214 to be open to an exterior of the housing assembly 130. The pan bore 618 can be coaxial with the pump bore 514.

The pump 170 can include a pump body or housing 626 that has the first inlet/outlet 630, the second inlet/outlet 634, and a plurality of mounting bores 638 (shown in FIG. 5) such that the mounting bolts 530 (FIG. 5) can be received therethrough to mount the pump 170 to the carrier housing 210. The pump housing 626 can be formed of a single piece or can be formed of multiple parts coupled together as an assembly. The pump 170 can be driven by the electric motor 166 to rotate a rotational element 640 of the pump 170 to pump hydraulic fluid or oil from the first inlet/outlet 630 to the second inlet/outlet 634. The first inlet/outlet 630 can be located proximate to the bottom side 522 of the carrier housing 210 and can be a cylindrical port that extends axially from the pump housing 626 into the reservoir 174. The outer circumferential surface of the first inlet/outlet 630 can include a plurality of external threads 642. In the example provided, the first inlet/outlet 630 can extend axially such that when the pump 170 is mounted to the pump mount 510, a terminal end 646 of the first inlet/outlet 630 is axially between the upper and bottom sides 610 and 622 of the oil pan 214. The second inlet/outlet 634 is located proximate to the oil supply passage 526 and is in fluid communication with the oil supply passage 526, such that the pump 170 can pump oil into the oil supply passage 526.

In the example provided, the pump housing 626 also includes a first O-ring groove 650 and a second O-ring groove 654 located about an outer cylindrical surface 658 of the pump housing 626 and configured to receive O-rings 662 therein to form a seal between the pump housing 626 and the pump bore 514. The first O-ring groove 650 and corresponding O-ring 662 can be located axially between the bottom side 522 of the pump mount 510 and the oil supply passage 526. The second O-ring groove 654 and corresponding O-ring 662 can be located axially between the oil supply passage 526 and the upper side 518 of the pump mount 510.

With specific reference to FIGS. 6 and 7, the filter 176 can be received in the pan bore 618 and into the reservoir 174 through the bottom side 622 of the oil pan 214. The filter 176 can be configured to filter the oil as it is drawn from the reservoir 174 before the oil enters the first inlet/outlet 630 of the pump 170. The filter 176 can include a filter base 710, a filter port 714, and a filter element 718. In the example provided, the filter base 710 and filter port 714 are formed of a single piece of material (e.g., unitarily formed), though other configurations can be used.

The filter base 710 can include a bottom wall 722 and a cylindrical wall 726. In the example provided, the bottom wall 722 can extend radially outward of the pan bore 618 to abut the bottom side 622 of the oil pan 214 to cover the entire pan bore 618. In the example provided, the bottom wall 722 can have a hexagonal outer perimeter shape to be easily gripped, such as by a wrench for example, though other configurations can be used. The cylindrical wall 726 can have an outer cylindrical surface 730 that can have a diameter that can be received in the pan bore 618. The cylindrical wall 726 can be fixedly coupled to the bottom wall 722 and can extend from the bottom wall 722 axially into the pan bore 618 to terminate axially between the bottom side 622 and upper side 610 of the oil pan 214. The cylindrical wall 726 can include an O-ring groove 734 open at the outer cylindrical surface 730 of the cylindrical wall 726. The O-ring groove 734 can be configured to receive an O-ring 738 therein to form a seal between the cylindrical wall 726 and the pan bore 618.

The filter port 714 can be fixedly coupled to the bottom wall 722 and can have a generally hollow cylindrical shape that extends from the bottom wall 722 axially into the reservoir 174. A first end 742 of the filter port 714, which is proximate to the bottom wall 722 and within the reservoir 174, can include at least one aperture 746 that extends radially through an inner surface 750 and an outer surface 754 of the filter port 714 to permit fluid communication between the reservoir 174 and an interior of the filter port 714. In the example provided, the first end 742 includes a plurality of the apertures 746. A second end 762 of the filter port 714, which is distal to the bottom wall 722, can define a plurality of internal threads 766 configured to mate with the external threads 642 of the first inlet/outlet 630. The interior of the filter port 714 can be in fluid communication with an interior of the first inlet/outlet 630 to permit the pump 170 to pump fluid between the reservoir 174 and the oil supply passage 526 when the internal threads 766 threadably engage the external threads 642. The threads 642, 766 can seal such that the fluid pumped by the pump 170 between the reservoir 174 and the first inlet/outlet 630 must pass through the apertures 746.

The filter element 718 can be located between the reservoir 174 and the first inlet/outlet 630 and can be configured to permit oil to flow through the filter element 718 while preventing particulates from flowing through. In the example provided, the filter element 718 is between the reservoir 174 and the apertures 746. In the example provided, the filter element 718 is a fine wire mesh, though other configurations can be used to filter particulates from the hydraulic oil. In the example provided, the filter element 718 can be frusto-conical in shape and can extend at an angle between the bottom wall 722 and the outer surface 754 of the filter port 714, such that the filter element narrows with increasing axial distance from the filter bottom wall 722, though other configurations can be used such as a cylindrically shaped filter element for example. In the example provided, a top end 774 of the filter element 718 can be fixedly attached to the outer surface 754 of the filter port 714, while a base end 778 can be fixedly attached to the bottom wall 722. In an alternative construction, not specifically shown, the base end 778 of the filter element 718 can be fixedly attached to the cylindrical wall 726.

In the example provided, the filter 176 can also include a plurality of circumferentially spaced apart support members 782 that can extend between the base end 778 and the top end 774. The support members 782 can be more rigid than the filter element 718 to provide support to the filter element 718 between the filter port 714 and the bottom wall 722.

Figure 8:
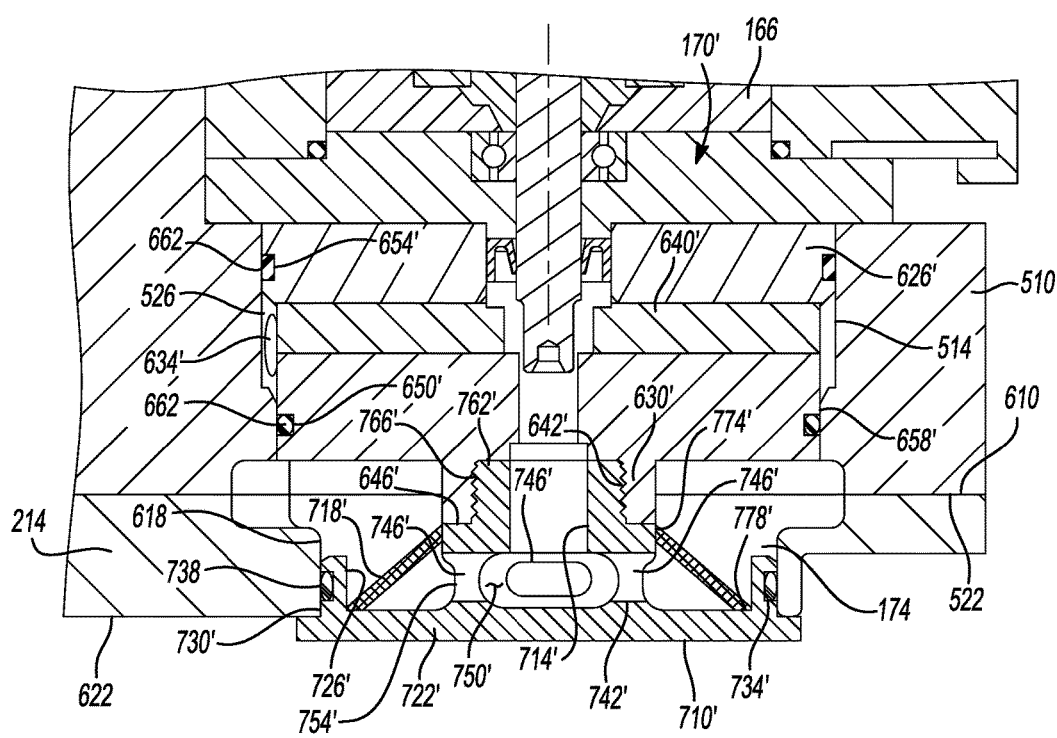
FIG. 8 is a sectional view similar to FIG. 6, illustrating a spin-on filter of a second configuration.

With additional reference to FIG. 8, a filter 176' and a pump 170' of a second construction is illustrated. The filter 176' and pump 170' can be similar to the filter 176 and pump 170 (FIGS. 2, 6, and 7) except as otherwise illustrated or described herein. Elements identified by primed reference numerals in FIG. 8 are similar to those identified by similar, non-primed reference numerals in FIGS. 1-7 and discussed above, except as otherwise illustrated or discussed herein. In the example provided in FIG. 8, the second end 762' of the filter port 714' defines a plurality of external threads 766' and the first inlet/outlet 630' of the pump 170' defines a plurality of internal threads 642' that mate with the external threads 766'.

In operation, the pump 170, 170' can draw oil from the reservoir 174, through the filter element 718, 718', and pump the oil through the oil supply passage 526, to the cylinder 182 (FIGS. 1 and 5). In this way, the pump 170, 170' can supply pressurized oil to the cylinder 182 (FIGS. 1 and 5) of the actuator 162 (FIG. 1) to move the piston 178 (FIG. 1) to compress the first and second friction plates 150 and 158 (FIG. 1) of the axle disconnect clutch 42 (FIG. 1).

In the example provided, the pump 170, 170' is a reversible pump and reverse operation of the pump 170, 170' can return the oil from the cylinder 182 (FIGS. 1 and 5), to the reservoir 174, through the filter element 718, 718'. In the example provided, the oil from the reservoir 174 can also be used in lubricating the first and second friction plates 150, 158 (FIG. 1), and/or the second differential assembly 118 (FIG. 1). For example, the reservoir 174 can be in fluid communication with the clutch cavity 226 and/or the differential cavity 230. Thus, the filter element 718, 718' can filter the oil of particulates from the first and second friction plates 150, 158 (FIG. 1), and/or the second differential assembly 118 (FIG. 1) before entering the pump 170, 170'.

The threads 642, 766 or 642', 766' can allow the filter 176, 176' to be easily removed from the rear axle assembly 26 for servicing or replacement and the O-ring 738 can provide a robust seal between the filter 176, 176' and the oil pan 214. The threaded connection directly between the pump 170, 170' and the filter 176, 176', along with the positioning of the filter element 718, 718' within the reservoir 174, can allow the filter 176, 176' and the rear axle assembly 26 to be compact to provide improved ground clearance, while greatly increasing the filtering area of the filter element 718, 718' to improve performance and longevity of the filter 176, 176'. The location of the filter 176, 176', coaxial with the pump 170, 170', can also permit the pump bore 514 to be a through-bore (i.e., through the upper and bottom sides 518, 522) to improve manufacturability of the carrier housing 210.

While the filter 176, 176' and pump 170, 170' are described herein with reference to a rear axle assembly 26, the filter 176, 176' and pump 170, 170' could be used on a different type of disconnecting axle assembly, such as the front axle assembly 20, for example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. An axle assembly comprising:
a housing defining a reservoir and a cylindrical bore open to the reservoir;
an input member and an output member;
a clutch including a hydraulic actuator operable to selectively activate the clutch to selectively transmit rotary power between the input member and the output member;
a pump mounted to the housing, the pump including a first inlet/outlet and a second inlet/outlet, the first inlet/outlet being in fluid communication with the reservoir and defining a first set of threads coaxial with the cylindrical bore, the second inlet/outlet being in fluid communication with the actuator, the pump being configured to pump a fluid between the first inlet/outlet and the second inlet/outlet; and
a filter including a filter base, a filter port, a filter element, and a seal member, the filter port defining a second set of threads configured to threadably engage the first set of threads, the filter base being fixedly coupled to the filter port and including a cylindrical wall coaxial with the second set of threads, the seal member configured to form a seal between the cylindrical wall and the cylindrical bore when the first and second sets of threads are threadably engaged, the filter element being disposed between the reservoir and the first inlet/outlet.

2. The axle assembly of claim 1, wherein the cylindrical wall defines a groove extending about a circumference of the cylindrical wall and the seal member is an O-ring received in the groove.

3. The axle assembly of claim 1, wherein the first set of threads are external threads and the second set of threads are internal threads.

4. The axle assembly of claim 1, wherein the first set of threads are internal threads and the second set of threads are external threads.

5. The axle assembly of claim 1, wherein the filter port includes at least one aperture that is axially between the filter base and the second set of threads, the at least one aperture of the filter port extending radially through the port to permit fluid communication between the reservoir and an interior of the filter port.

6. The axle assembly of claim 5, wherein the filter element is disposed between the reservoir and the at least one aperture to filter particulates before entering the interior of the filter port.

7. The axle assembly of claim 1, wherein the filter element extends between the filter port and the filter base.

8. The axle assembly of claim 7, wherein the filter element is a frusto-conical shape that narrows with increased axial distance from the filter base.

9. The axle assembly of claim 1, further comprising a servo motor drivingly coupled to the pump, wherein activation of the servo motor operates the pump to pump fluid between the first inlet/outlet and the second inlet/outlet.

10. The axle assembly of claim 1, wherein the pump is disposed within the cylindrical bore.

11. The axle assembly of claim 1 wherein the first inlet/outlet extends axially into the reservoir.

12. An axle assembly comprising:
a housing defining a reservoir and a bore that extends through a first side of the housing and a second side of the housing and is open to the reservoir between the first and second sides;
an input member and an output member;
a clutch including a hydraulic actuator operable to selectively activate the clutch to selectively transmit rotary power between the input member and the output member;
a pump including a pump body, the pump body being mounted to the housing, the pump body including a first inlet/outlet and a second inlet/outlet, the first inlet/outlet being in fluid communication with the reservoir and defining a first set of threads coaxial with the cylindrical bore, the second inlet/outlet being in fluid communication with the actuator, the pump being configured to pump a fluid between the first inlet/outlet and the second inlet/outlet; and
a filter including a filter base, a filter port, a filter element, and a seal member, the filter port defining a second set of threads configured to threadably engage the first set of threads, the filter port being fixedly coupled to the filter base, wherein at least one aperture extends radially through an outer surface of the filter port and an inner surface of the filter port to permit fluid communication between the reservoir and the first inlet/outlet, the seal member forming a seal between the filter base and the housing when the first and second sets of threads are threadably engaged, the filter element being disposed between the reservoir and the first inlet/outlet.

13. The axle assembly of claim 12, wherein the filter base includes a cylindrical wall that defines a groove extending about a circumference of the cylindrical wall and the seal member is an O-ring received in the groove.

14. The axle assembly of claim 12, wherein the first set of threads are external threads and the second set of threads are internal threads.

15. The axle assembly of claim 12, wherein the filter element is disposed between the reservoir and the at least one aperture to filter particulates before entering the interior of the filter port.

16. The axle assembly of claim 12, wherein the filter element extends between the outer surface of the filter port and the filter base.

17. The axle assembly of claim 16, wherein the filter element is a frusto-conical shape that narrows with increased axial distance from the filter base.

18. The axle assembly of claim 12, further comprising a servo motor drivingly coupled to the pump, wherein activation of the servo motor operates the pump to pump fluid between the first inlet/outlet and the second inlet/outlet.

19. The axle assembly of claim 12, wherein the pump housing is disposed within the cylindrical bore.

20. The axle assembly of claim 12 wherein the first inlet/outlet extends axially into the reservoir.

* * * * *